(12) United States Patent
Horiuchi et al.

(10) Patent No.: US 8,222,178 B2
(45) Date of Patent: Jul. 17, 2012

(54) CATALYST AND PRODUCTION PROCESS THEREOF, AND CHLORINE PRODUCTION USING THE CATALYST

(75) Inventors: Nobuhiko Horiuchi, Chiba (JP);
Kenichi Sugimoto, Yokohama (JP);
Masami Murakami, Ichihara (JP);
Kenji Iwata, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 1 day.

(21) Appl. No.: 12/733,848

(22) PCT Filed: Sep. 22, 2008

(86) PCT No.: PCT/JP2008/067085
§ 371 (c)(1),
(2), (4) Date: Mar. 24, 2010

(87) PCT Pub. No.: WO2009/041384
PCT Pub. Date: Apr. 2, 2009

(65) Prior Publication Data
US 2010/0196255 A1    Aug. 5, 2010

(30) Foreign Application Priority Data
Sep. 27, 2007 (JP) ................................. 2007-251808

(51) Int. Cl.
*B01J 23/00* (2006.01)
*B01J 23/10* (2006.01)
*B01J 23/70* (2006.01)
*B01J 23/72* (2006.01)
*C01B 7/00* (2006.01)

(52) U.S. Cl. ......... 502/303; 502/345; 423/502; 423/507

(58) Field of Classification Search .......... 502/302–304, 502/344–345; 423/502, 507
See application file for complete search history.

(56) References Cited

U.S. PATENT DOCUMENTS

| | | | |
|---|---|---|---|
| 3,260,678 A | 7/1966 | Engel et al. | |
| 3,483,136 A | 12/1969 | van der Plas et al. | |
| 4,740,642 A * | 4/1988 | Eden et al. ..................... | 570/243 |
| 4,822,589 A | 4/1989 | Kiyoura et al. | |
| 4,849,393 A * | 7/1989 | Eden et al. ..................... | 502/225 |
| 5,292,703 A * | 3/1994 | Young et al. .................. | 502/303 |
| 5,320,999 A * | 6/1994 | Muramatsu et al. .......... | 502/303 |
| 5,340,548 A * | 8/1994 | Abe et al. ....................... | 422/177 |
| 5,382,726 A * | 1/1995 | Young et al. .................. | 570/243 |
| 5,871,707 A | 2/1999 | Hibi et al. | |
| 2008/0248946 A1 * | 10/2008 | Egami ........................... | 502/302 |

FOREIGN PATENT DOCUMENTS

| | | |
|---|---|---|
| JP | 1-257102 | 10/1989 |
| JP | 09-67103 A | 3/1997 |
| JP | 10-5592 | 1/1998 |
| WO | WO 88/00171 A1 | 1/1988 |

OTHER PUBLICATIONS

International Search Report received in corresponding International Application No. PCT/JP2008/067085.

* cited by examiner

*Primary Examiner* — Steven Bos
*Assistant Examiner* — Anthony J Zimmer
(74) *Attorney, Agent, or Firm* — Foley & Lardner LLP

(57) ABSTRACT

A catalyst has high activity and is suitable for use in producing chlorine by oxidizing hydrogen chloride with oxygen. The catalyst includes copper, an alkali metal and a rare earth and has pores of which pores having a diameter of 5 to 15 nm have a pore volume of 0.4 to 2.0 ml/g.

9 Claims, No Drawings

CATALYST AND PRODUCTION PROCESS
THEREOF, AND CHLORINE PRODUCTION
USING THE CATALYST

TECHNICAL FIELD

The present invention relates to catalysts and production processes thereof, and chlorine production using the catalyst.

BACKGROUND OF THE INVENTION

Chlorine is a useful material for vinyl chloride and phosgene. Chlorine is mainly produced by brine electrolysis or catalytic oxidation of hydrogen chloride.

Brine electrolysis entails a great amount of electricity and is disadvantageous in terms of energy. It also generates sodium hydroxide as a by-product, and therefore the balance between the products has to be considered.

In the catalytic oxidation of hydrogen chloride, hydrogen chloride that is a material is a by-product from the production of vinyl chloride or phosgene. Therefore, this process is advantageous in view of effective use of by-products.

The catalytic oxidation of hydrogen chloride into chlorine is an exothermic reaction. The equilibrium conversion is dependent on temperature, and the reaction is more advantageous when carried out at lower temperatures. For use in this reaction, Deacon catalysts based on copper, $Cr_2O_3/SiO_2$ catalyst and $RuO_2/TiO_2$ catalyst are known (for example, Patent Document 1).

Known copper-based Deacon catalysts include catalysts in which copper chloride, an alkali metal chloride and a lanthanoid such as didymium chloride are supported on a silica gel carrier with a specific surface area of not less than 200 m$^2$/g and an average pore diameter of not less than 60 Å (for example, Patent Document 2), and fluidized bed catalysts in which copper, potassium and didymium are impregnated in a silica gel having a specific surface area of 410 m$^2$/g and a pore volume of 0.72 ml/g (for example, Patent Document 3).

These catalysts, however, have both merits and demerits. The Deacon catalysts and $Cr_2O_3/SiO_2$ catalyst have inexpensive active components, but their activity is insufficient and the reaction has to be made at high temperatures. The oxidation of hydrochloric acid is exothermic, and the reaction equilibrium gives a lower conversion at a higher temperature. The $RuO_2/TiO_2$ catalyst has high activity and can catalyze the reaction even if it is supported in a small amount. However, it is necessary that the noble metal should be recovered and recycled from the exhausted catalyst. Furthermore, Ru has become more expensive due to recent increase in demands. Thus, this catalyst is disadvantageous in view of stable supply and costs.

The didymium is a mixture containing various rare earth elements. The mixture has a different composition depending on the place and time where it is mined. Accordingly, catalysts containing didymium show varied activity and do not provide stable performance.

Thus, there is a demand for catalysts that have inexpensive and stably supplied components and can catalyze a reaction at lower temperatures.
[Patent Document 1] JP-A-H09-67103
[Patent Document 2] U.S. Pat. No. 3,260,678
[Patent Document 3] U.S. Pat. No. 3,483,136

DISCLOSURE OF THE INVENTION

The present invention has been made in view of the aforementioned problems. It is therefore an object of the invention to provide catalysts which are used in producing chlorine by oxidizing hydrogen chloride and which have high activity and are inexpensively and stably manufactured.

The present inventors studied diligently to achieve the above object and have found that the object is achieved with catalysts having a specific pore structure. The present invention has been completed based on the finding.

A catalyst according to the present invention comprises copper, an alkali metal and a rare earth and has pores of which pores having a diameter of 5 to 15 nm have a pore volume of 0.4 to 2.0 ml/g.

Preferably, the catalyst has a specific surface area of 100 to 500 m$^2$/g, and more preferably 170 to 500 m$^2$/g.

Preferably, the catalyst contains copper at 1 to 11 wt % based on 100 wt % of the catalyst, and the copper:rare earth weight ratio is in the range of 1:0.6 to 1:1.5 and the copper:alkali metal weight ratio is in the range of 1:0.4 to 1:1.0.

The alkali metal is preferably potassium.

The rare earth is preferably at least one selected from the group consisting of lanthanum, praseodymium, neodymium, samarium and europium.

A process for producing the catalyst according to the present invention comprises a step of distributing a copper compound, an alkali metal compound and a rare earth compound in a carrier, the carrier having pores of which pores having a diameter of 5 to 18 nm have a pore volume of 0.5 to 2.5 ml/g.

In a preferred aspect of the invention, a process for producing the catalyst according to the present invention comprises a step of distributing a copper compound, an alkali metal compound and a rare earth compound in a carrier, the carrier having pores of which pores having a diameter of 5 to 18 nm have a pore volume of 0.5 to 2.5 ml/g; and a step of calcining the carrier in which the copper compound, the alkali metal compound and the rare earth compound are distributed at a temperature of 200 to 600° C.

In the processes, it is preferable that the copper compound, the alkali metal compound and the rare earth compound are each independently a chloride, a nitrate or an acetate.

A process of producing chlorine according to the present invention comprises oxidizing hydrogen chloride with oxygen into chlorine in the presence of the catalyst as described above.

ADVANTAGES OF THE INVENTION

The catalysts according to the present invention have higher activity than conventional catalysts in which copper, alkali metal and rare earth metal are supported on silica, enabling a reaction at lower temperatures. The catalysts allow for economic production of chlorine by oxidizing hydrogen chloride with oxygen.

PREFERRED EMBODIMENTS OF THE
INVENTION

The present invention will be described in detail.
The catalyst according to the present invention contains copper, an alkali metal and a rare earth and has pores of which pores having a diameter of 5 to 15 nm have a pore volume of 0.4 to 2.0 ml/g.

In the invention, the pore volume and average pore diameter of the catalyst are determined by measurement of pore size distribution in which a nitrogen adsorption isotherm is analyzed by BJH (Barrett-Joyner-Halenda) method (see JACS 73 (1951) 373). In detail, measurement of pore size distribution of the catalyst in which a nitrogen adsorption isotherm is analyzed by BJH method shows that the pore volume of pores having a diameter of 5 to 15 nm is 0.4 to 2.0 ml/g. The specific surface area is determined by BET method (see JACS 60 (1938) 309).

The catalyst according to the present invention has a pore structure in which pores having a diameter of 5 to 15 nm have a pore volume of 0.4 to 2.0 ml/g, and preferably 0.45 to 2.0 ml/g. The pore diameters are involved with diffusion and transfer of reactants and products. If the pore diameters are very large, the diffusion is fast but chances for the reactants to contact the catalyst surface are lowered. In contrast, excessively small pore diameters slow the diffusion. In view of reaction frequency and diffusion rate, pores with a diameter of 5 to 15 nm determine the activity of the catalyst. The pore volumes of the pores having the above diameters are associated with the number of active sites, and it has been demonstrated that high activity is achieved with good reproducibility according to the above described range. Although it may seem that a larger pore volume is more desirable, pore volumes exceeding 2.0 ml/g cause insufficient catalytic activity because the catalyst components are distributed at different rates in the catalyst production and the catalyst becomes inhomogeneous with a nonuniform composition. Further, pore volumes exceeding 2.0 ml/g invite insufficient catalyst strength and the catalyst may collapse.

Catalysts containing copper, alkali metals and rare earths are conventionally known. However, there have been no studies on pore structures of the catalysts. For example, Patent Document 2 only describes that the catalytic activity is affected by properties of carriers that support active components. The present inventors have found that catalysts containing copper, alkali metals and rare earths show different activity even when the carrier is identical if the active components are supported in different manners or amounts, and that the catalysts show varied activity even when properties of the carrier are specified. The inventors have further studied and have found that a pore structure of the catalyst satisfying the above condition provides high activity. According to the present invention, the catalyst components are supported such that a preferred pore structure is formed, and consequently the catalyst shows high activity irrespective of properties of carriers.

The catalyst has a specific surface area of 100 to 500 $m^2/g$, preferably 170 to 500 $m^2/g$, and more preferably 200 to 500 $m^2/g$. Although a larger specific surface area provides more active sites, the larger the specific surface area is, the more easily the pore structure collapses. The specific surface area in the above range provides sufficient active sites while avoiding such risk of collapse.

The active components in the catalysts of the invention are copper, alkali metals and rare earths. These active components are described below.

The copper in the catalyst of the invention may be monovalent or divalent. The copper content is preferably 1 to 11 wt %, more preferably 1.3 to 10 wt %, and still more preferably 2 to 10 wt % based on 100 wt % of the catalyst.

The alkali metals for use in the catalyst of the invention include lithium, sodium, potassium, rubidium, cesium and francium. The alkali metals may be used singly, or two or more kinds may be used in combination. Of these, sodium and/or potassium is preferable, and potassium is more preferable. The content of the alkali metals is preferably 0.4 to 9 wt %, more preferably 0.5 to 9 wt %, still more preferably 1 to 9 wt %, and particularly preferably 2 to 8 wt % based on 100 wt % of the catalyst.

The rare earths for use in the catalyst of the invention include scandium, yttrium and lanthanoid series with atomic numbers 57 to 71 of Group III in the periodic table. The rare earths may be used singly, or two or more kinds may be used in combination. Of these, yttrium, scandium, lanthanum, praseodymium, neodymium, samarium, europium, gadolinium, dysprosium and ytterbium are preferred, and lanthanum, praseodymium, neodymium, samarium and europium are more preferred. The content of the rare earths is preferably 0.6 to 11 wt %, more preferably 0.8 to 11 wt %, still more preferably 1 to 11 wt %, and particularly preferably 2 to 10 wt % based on 100 wt % of the catalyst.

Preferably, the copper:rare earth weight ratio is in the range of 1:0.6 to 1:1.5, and the copper:alkali metal weight ratio is in the range of 1:0.4 to 1:1.0. More preferably, the copper:rare earth weight ratio is in the range of 1:0.8 to 1:1.3, and the copper:alkali metal weight ratio is in the range of 1:0.5 to 1:0.9. When these ratios are satisfied, the catalyst production from the components is easy, and high catalytic activity is obtained.

In the catalyst of the invention, the above active components are generally supported on a carrier. The carrier in which the active components are distributed and supported has corrosion resistance against decomposition with hydrochloric acid or chlorine. It is preferable to use a carrier that has pores of which pores having a diameter of 5 to 18 nm have a pore volume of 0.5 to 2.5 ml/g, and more preferably 0.5 to 2.0 ml/g.

The carriers may be particles, granules or various shaped products. In order that the active components are uniformly distributed and supported, particles are preferable. The carrier materials include silica, silica alumina, titania and zirconia, with silica being preferable. Examples of the silica carriers include commercially available silica gels and fumed silicas. The carrier content in the catalyst is generally 98 to 65 wt %, preferably 97 to 69 wt %, and more preferably 94 to 72 wt % based on 100 wt % of the catalyst. This carrier content ensures both catalytic activity and strength.

The catalyst of the invention may contain a component (additional component) other than the active components and the carrier. Such additional components include palladium, iridium, chromium, vanadium, niobium and alkaline earth metals. These additional components may be contained at 0.01 to 10 parts by weight based on 100 parts by weight of the carrier.

Processes for producing the catalysts of the invention are not particularly limited. An exemplary process is given below.

A process for producing the catalyst according to the present invention comprises a step of distributing a copper compound, an alkali metal compound and a rare earth compound in a carrier, the carrier having pores of which pores having a diameter of 5 to 18 nm have a pore volume of 0.5 to 2.5 ml/g. The process preferably further comprises a step of calcining the carrier in which the copper compound, the alkali metal compound and the rare earth compound are distributed at a temperature of 200 to 600° C.

In the above process, copper, alkali metal and rare earth that are the active components are distributed in the carrier as a copper compound, an alkali metal compound and a rare earth compound, respectively. The carrier preferably has pores of which pores having a diameter of 5 to 18 nm have a pore volume of 0.5 to 2.5 ml/g, and more preferably 0.5 to 2.0 ml/g. Methods for distributing the components in the carrier are not particularly limited. Exemplary methods include deposition of the above elements in a vacuum chamber, gas-phase supporting and liquid-phase supporting. In view of operation properties and distribution uniformity, liquid-phase supporting is preferable. In the case of liquid-phase supporting, compounds containing the active components may be added to a solvent to give a material solution or dispersion, and the solution or dispersion may be sprayed to the carrier. Alternatively, the carrier may be soaked in the material solution or dispersion, and the solution or dispersion may be evaporated to dryness while stirring the liquid. Still alternatively, the carrier may be soaked in the material solution or dispersion, then recovered therefrom, and dried. When the amounts of the components distributed and supported by soaking the carrier in the material solution or dispersion are small, the catalyst carrier may be soaked again in the material solution or dispersion to increase the contents of the active components. The active components in the solution or dispersion may remain undissolved or may be solid as long as they are small enough to enter the pores of the carrier. However, in order that the active components are uniformly distributed in the pores, the active components are preferably dissolved in the solvent, in other words, a material solution is preferable.

The catalyst of the invention may be obtained by distributing the active components in the carrier as described above. It is preferable that the volume of the solution- or dispersion-origin solvent remaining in the catalyst is smaller than the pore volume of the catalyst. If the volume of the solvent remaining in the catalyst is larger than the pore volume of the catalyst, the active components may transfer throughout the catalyst via the solvent exposed on the catalyst surface after the catalyst is packed in a reactor, and nonuniform distribution of the active components may result after the evaporation or volatilization of the solvent from the catalyst surface. If the volume of the solvent remaining in the catalyst is smaller than the pore volume of the catalyst, the residual solvent does not leak on the surface and the active components remain in the respective pores, ensuring uniform and fixed supporting amounts.

The solvents for the active components in the liquid-phase supporting are not particularly limited as long as compounds containing the active components are dissolved or dispersed. Water is preferable in view of easy handling. The concentrations of the active components in the solvent are not particularly limited as long as compounds containing the active components are uniformly dissolved or dispersed. However, the supporting of the active components requires a long time when the concentrations are excessively low, and therefore the concentrations of the active components are preferably 1 to 50 wt %, and more preferably 2 to 40 wt % based on 100 wt % of the active components and the solvent combined.

In the process for producing the catalyst of the invention, the catalyst should be desolvated before packed in a reactor when more than the pore volume of the solvent remains in the catalyst. If the volume of the residual solvent is less than the pore volume, the catalyst may be used with or without desolvation. The desolvation may be achieved by drying alone or by drying and calcination. Drying conditions are not particularly limited, but the drying is generally carried out at atmospheric pressure or reduced pressure at 0 to 120° C. for 10 minutes to 24 hours.

In the process for producing the catalyst of the invention, the carrier in which the copper compound, the alkali metal compound and the rare earth compound are distributed is preferably calcined at a temperature of 200 to 600° C. The calcination may be carried out in an air atmosphere for 1 to 10 hours.

The copper compound, the alkali metal compound and the rare earth compound distributed in the carrier are not limited. Generally, they are each independently a halide, a nitrate, a sulfate, an acetate, a carbonate, an oxalate, an alkoxide or a complex salt. Of these, chlorides, nitrates and acetates are preferable because of easy formation of the salts. Further, nitrates and acetates are preferable because they will not corrode a catalyst production apparatus containing iron materials such as stainless steel.

The amounts of the copper compound, the alkali metal compound, the rare earth compound and the carrier may vary depending on how the components are supported. The amounts are preferably such that the catalyst will contain copper, alkali metal and rare earth in the aforementioned amounts.

The shapes of the catalysts obtained by the process of the invention are not particularly limited, and any shapes may be used in the invention. Examples of the shapes include powders, granules, pellets, spheres and noodles. The catalyst size is not particularly limited as long as the catalyst may be packed in a reactor.

When a silica carrier is used, a commercially available product may be used directly. However, such silica may be used after dried or calcined at 30 to 700° C.

In addition to the copper compound, the alkali metal compound and the rare earth compound, other compounds may be distributed in the carrier. Examples of such compounds include palladium compounds, iridium compounds, chromium compounds, vanadium compounds, niobium compounds and alkaline earth metal compounds. These compounds may be added without limitation. For example, they may give a solution together with the copper compound, the alkali metal compound and the rare earth compound and distributed in the carrier together. Alternatively, these compounds may be separately distributed in the carrier before or after the active components. Catalysts that contain components other than the active components and the carrier may be thus obtained. The catalyst may contain such components at 0.01 to 10 parts by weight in terms of metal element based on 100 parts by weight of the carrier.

Next, chlorine production using the above catalyst will be described. In a process of producing chlorine according to the present invention, hydrogen chloride is oxidized with oxygen into chlorine in the presence of the catalyst as described above.

The catalyst is suited for use in the chlorine production by oxidizing hydrogen chloride with oxygen.

Reaction conditions are not particularly limited as long as hydrogen chloride and oxygen react with each other. Batch reaction or flow reaction may be used. In the case of flow reaction, a reactor may be a fluidized bed, a fixed bed or a moving bed. The reaction mode determines a catalyst shape. Because the reaction is an equilibrium reaction, the conversion is lowered if the reaction temperature is excessively high. If the reaction temperature is excessively low, the catalytic activity is insufficient. The reaction temperature is generally in the range of 250 to 500° C., and preferably 320 to 420° C. In view of operation properties, the pressure during the reaction is suitably from about atmospheric pressure to 50 atm.

The oxygen used in the reaction may be air. However, because the reaction is an equilibrium reaction and 100% conversion cannot be reached, chlorine that is produced should be separated from unreacted hydrochloric acid. Therefore, it is more preferable that the oxygen source is pure oxygen not containing inert nitrogen gas. The theoretical molar ratio of hydrogen chloride to oxygen (hydrogen chloride/oxygen) is 4. However, because higher activity is generally obtained by supplying oxygen in excess over the theoretical amount, the molar ratio of hydrogen chloride to oxygen (hydrogen chloride/oxygen) is preferably from 1 to 2.9. The feeding rate of hydrogen chloride relative to the catalyst weight is generally 130 to 3000 L/h per 1 kg of the catalyst.

EXAMPLES

The present invention will be described below by presenting Examples and Comparative Examples without limiting the scope of the invention.

In Examples and Comparative Examples, the pore volume and the average pore diameter of catalysts were obtained by analyzing an adsorption isotherm measured with Autosorb 3 (manufactured by Quantachrome Instruments), by BJH (Barrett-Joyner-Halenda) method. The specific surface area was determined by BET method. The measurement range of pore diameters was from 1 to 100 nm.

The catalysts obtained in Examples and Comparative Examples were tested to evaluate catalytic activity as follows unless otherwise specified.

The catalyst particles were sieved to a size of 10-20 mesh. Thereafter, 2 g of the catalyst was packed in a ½ inch reaction tube, and hydrogen chloride and oxygen were supplied at 57 ml/min and 28.5 ml/min, respectively, and were reacted at 390° C. Potassium iodide (KANTO CHEMICAL CO., INC., a reagent for oxidant measurement) was dissolved in water to give a 0.2 mol/l solution. Into 300 ml of this solution, the gas generated was absorbed for 8 minutes. The amount of chlorine produced was measured with a 0.1 mol/l sodium thiosulfate solution (KANTO CHEMICAL CO., INC.), and the conversion of hydrogen chloride was determined. The results are shown in Table 2.

Example 1

Silica powder (C-1504 manufactured by FUJI SILYSIA CHEMICAL LTD.) had a particle diameter of 3.9 μm, an average pore diameter of 12.3 nm, a specific surface area of 556 $m^2/g$ and a total pore volume of 1.7 ml/g and had pores of which pores having a diameter of 5 to 18 nm had a pore volume of 1.6 ml/g. The powder was calcined in air at 500° C. for 2 hours (silica carrier 1). Separately, a glass flask was charged with 30 g of water, 1.29 g of copper (II) chloride (Wako Pure Chemical Industries, Ltd., special grade), 1.6 g of lanthanum chloride heptahydrate (Wako Pure Chemical Industries, Ltd., special grade) and 0.67 g of potassium chloride (Wako Pure Chemical Industries, Ltd., special grade), resulting in an aqueous solution. The silica carrier 1 weighing 10.1 g was added to the aqueous solution, and the solution was evaporated to dryness at 80° C. in a rotary evaporator. The carrier was then calcined in air at 250° C. for 3 hours, and a supported catalyst (catalyst 1) having a weight ratio Cu:K:La:$SiO_2$ of 5:3:5:87 was obtained. The pore size distribution measurement with the catalyst 1 showed a specific surface area of 316 $m^2/g$, and the pore volume of pores having a diameter of 5 to 15 nm was found to be 1.05 ml/g.

Example 2

A supported catalyst (catalyst 2) having the same weight ratio as that in Example 1 was manufactured in the same manner as in Example 1, except that the carrier was changed to Q-10 (manufactured by FUJI SILYSIA CHEMICAL LTD.) (silica carrier 2) that had a particle diameter of 75 to 500 μm, an average pore diameter of 18.1 nm, a specific surface area of 254 $m^2/g$ and a total pore volume of 1.2 ml/g and had pores of which pores having a diameter of 5 to 18 nm had a pore volume of 0.88 ml/g. The pore size distribution measurement with the catalyst 0.2 showed a specific surface area of 177 $m^2/g$, and the pore volume of pores having a diameter of 5 to 15 nm was found to be 0.74 ml/g.

Example 3

A supported catalyst (catalyst 3) having the same weight ratio as that in Example 1 was manufactured in the same manner as in Example 1, except that the carrier was changed to Q-6 (manufactured by FUJI SILYSIA CHEMICAL LTD.) (silica carrier 3) that had a particle diameter of 75 to 500 μm, an average pore diameter of 5.5 nm, a specific surface area of 355 $m^2/g$ and a total pore volume of 0.76 ml/g and had pores of which pores having a diameter of 5 to 18 nm had a pore volume of 0.67 ml/g. The pore size distribution measurement with the catalyst 3 showed a specific surface area of 280 $m^2/g$, and the pore volume of pores having a diameter of 5 to 15 nm was found to be 0.55 ml/g.

Comparative Example 1

A supported catalyst (catalyst 4) having the same weight ratio as that in Example 1 was manufactured in the same manner as in Example 1, except that the carrier was changed to H-33 (manufactured by ASAHI GLASS CO., LTD.) (silica carrier 4) that had a particle diameter of 3.1 μm, an average pore diameter of 10.6 nm, a specific surface area of 722 $m^2/g$ and a total pore volume of 1.9 ml/g and had pores of which pores having a diameter of 5 to 18 nm had a pore volume of 0.42 ml/g. The pore size distribution measurement with the catalyst 4 showed a specific surface area of 277 $m^2/g$, and the pore volume of pores having a diameter of 5 to 15 nm was found to be 0.35 ml/g.

Comparative Example 2

A supported catalyst (catalyst 5) having the same weight ratio as that in Example 1 was manufactured in the same manner as in Example 1, except that the carrier was changed to Q-3 (manufactured by FUJI SILYSIA CHEMICAL LTD.) (silica carrier 5) that had a particle diameter of 75 to 500 μm, an average pore diameter of 2.6 nm, a specific surface area of 675 $m^2/g$ and a total pore volume of 0.43 ml/g and had pores of which pores having a diameter of 5 to 18 nm had a pore volume of 0.01 ml/g. The pore size distribution measurement with the catalyst 5 showed a specific surface area of 175 $m^2/g$, and the pore volume of pores having a diameter of 5 to 15 nm was found to be 0.06 ml/g.

Examples 4 to 9

Catalysts were prepared similar to Example 1 while the weight ratio of the catalyst components was changed as follows.

TABLE 1

|  | Cu | K | La | $SiO_2$ |
| --- | --- | --- | --- | --- |
| Ex. 4, Cat. 6 | 5.0 | 1.5 | 5.0 | 88.5 |
| Ex. 5, Cat. 7 | 5.0 | 3.0 | 2.5 | 89.5 |
| Ex. 6, Cat. 8 | 2.5 | 3.0 | 5.0 | 89.5 |
| Ex. 7, Cat. 9 | 5.0 | 10.0 | 5.0 | 80.0 |
| Ex. 8, Cat. 10 | 5.0 | 3.0 | 13.0 | 79.0 |
| Ex. 9, Cat. 11 | 13.0 | 3.0 | 5.0 | 79.0 |

Examples 10 to 12

Catalysts (catalysts 12 to 14) were prepared similar to Example 1, except that lanthanum was changed to praseodymium (Example 10), samarium (Example 11) and europium (Example 12). The results of pore size distribution measurement are shown in Table 2.

Examples 13 to 19

Catalysts (catalysts 15 to 21) were prepared similar to Example 1, except that half the weight ratio of lanthanum was replaced by praseodymium (Example 13), neodymium (Example 14), samarium (Example 15), europium (Example 16), gadolinium (Example 17), dysprosium (Example 18) and ytterbium (Example 19). The results of pore size distribution measurement are shown in Table 2.

Example 20

A catalyst (catalyst 22) was prepared similar to Example 1, except that potassium was changed to sodium. The results of pore size distribution measurement are shown in Table 2.

Example 21

A catalyst (catalyst 23) was prepared similar to Example 1, except that potassium was changed to cesium. The results of pore size distribution measurement are shown in Table 2.

Example 22

A catalyst (catalyst 24) was prepared similar to Example 11, except that the chloride material was changed to a nitrate material and the calcination temperature was changed from 250° C. to 400° C. The catalyst had a weight ratio Cu:K:Sm:$SiO_2$ of 5:3:5:87. The results of pore size distribution measurement are shown in Table 2.

Example 23

A catalyst (catalyst 25) was prepared similar to Example 11, except that the chloride material was changed to an acetate material and the calcination temperature was changed from 250° C. to 400° C. The catalyst had a weight ratio Cu:K:Sm:$SiO_2$ of 5:3:5:87. The results of pore size distribution measurement are shown in Table 2.

Example 24

A catalyst (catalyst 26) having a weight ratio Cu:K:Sm:$SiO_2$ of 7:4.2:7:81.8 was prepared similar to Example 22 while changing the material ratio. The results of pore size distribution measurement are shown in Table 2.

Example 25

8 g of silica (C-1504), 0.22 g of methyl cellulose (SM-4000 manufactured by Shin-Etsu Chemical Co., Ltd.), 13.6 g of silica sol (SNOWTEX S manufactured by Nissan Chemical) and 10 g of water were kneaded in a mortar and extruded to a size 2.0 mm in diameter. The extruded product was dried at 120° C. for 3 hours and calcined at 500° C. for 2 hours. The carrier particles were sieved to a size of 10-20 mesh (silica carrier 6). The pore size distribution measurement with the silica carrier 6 showed an average pore diameter of 8.2 nm, a specific surface area of 339 $m^2/g$ and a total pore volume of 0.69 ml/g, and the pore volume of pores having a diameter of 5 to 18 nm was found to be 0.61 ml/g. A catalyst (catalyst 27) having the same composition as that in Example 13 was prepared in the same manner as in Example 13 using the silica carrier 6.

Example 26

8 g of silica (C-1504), 0.22 g of methyl cellulose (SM-4000 manufactured by Shin-Etsu Chemical Co., Ltd.), 6.8 g of silica sol (SNOWTEX S manufactured by Nissan Chemical) and 20 g of water were kneaded in a mortar and extruded to a size 2.0 mm in diameter. The extruded product was dried at 120° C. for 3 hours and calcined at 500° C. for 2 hours. The carrier particles were sieved to a size of 10-20 mesh (silica carrier 7). The pore size distribution measurement with the silica carrier 7 showed an average pore diameter of 8.7 nm, a specific surface area of 366 $m^2/g$ and a total pore volume of 0.80 ml/g, and the pore volume of pores having a diameter of 5 to 18 nm was found to be 0.74 ml/g. A catalyst (catalyst 28) having the same composition as that in Example 13 was prepared in the same manner as in Example 13 using the silica carrier 7.

Example 27

4.4 g of copper (II) nitrate (KANTO CHEMICAL CO., INC., special grade), 1.8 g of potassium nitrate (JUNSEI CHEMICAL CO., LTD., special grade) and 3.4 g of samarium nitrate (Wako Pure Chemical Industries, Ltd., special grade) were dissolved in 50 g of water (solution A). While mixing 20 g of silica (C-1504) and 0.6 g of methyl cellulose (SM-4000 manufactured by Shin-Etsu Chemical Co., Ltd.) in a kneader, 17 g of silica sol was added. Thereafter, the solution A was added, and the mixture was kneaded for 10 minutes and extruded to a size 2.0 mm in diameter. The extruded product was dried at 120° C. for 3 hours and calcined at 400° C. for 3 hours. The catalyst particles were sieved to a size of 10-20 mesh. This catalyst (catalyst 29) had the same composition as that in Example 22.

Example 29

A catalyst (catalyst 31) having a weight ratio Cu:K:Sm:$SiO_2$ of 3.5:2.1:3.5:90.9 was prepared similar to Example 11 while changing the material ratio and changing the carrier to Q-15 (manufactured by FUJI SILYSIA CHEMICAL LTD.) (silica carrier 8) that had a particle diameter of 75 to 500 μm, an average pore diameter of 21.1 nm, a specific surface area of 230 $m^2/g$ and a total pore volume of 1.2 ml/g and had pores of which pores having a diameter of 5 to 18 nm had a pore volume of 0.50 ml/g.

Example 30

A catalyst (catalyst 32) having a weight ratio Cu:K:Sm:$SiO_2$ of 2.5:1.5:2.5:93.5 was prepared similar to Example 29 while changing the material ratio.

Example 31

A catalyst (catalyst 33) having a weight ratio Cu:K:Sm:$SiO_2$ of 1.5:0.9:1.5:96.1 was prepared similar to Example 29 while changing the material ratio.

Example 32

An aqueous solution (solution B) was prepared by adding 0.69 g of copper (II) chloride, 0.76 g of samarium chloride hexahydrate and 0.36 g of potassium chloride to 10 g of water. While the silica carrier 8 weighing 20 g was rotated in a 25 cm-diameter pan mixer at 30 rpm, the solution B was sprayed to the carrier and was absorbed therein for 2 hours of rotation. The carrier was transferred to a rotary evaporator and was dried at 95° C. for 30 minutes. A supported catalyst (catalyst 34) having a weight ratio Cu:K:Sm:SiO$_2$ of 1.5:0.9:1.5:96.1 was obtained.

Example 33

A catalyst (catalyst 35) having the same weight ratio as that in Example 32 was manufactured in the same manner as in Example 32, except that the drying at 95° C. in a rotary evaporator was not performed. In the catalyst obtained, 45% of the pore volume was filled with water.

Example 35

A catalyst (catalyst 37) having a weight ratio Cu:K:Sm:SiO$_2$ of 7:4.2:7:81.8 was prepared similar to Example 31 while changing the material ratio.

TABLE 2

| Catalyst | Pore volume of pores with 5 to 15 nm diameter (ml/g) | Specific surface area (m$^2$/g) | Hydrogen chloride conversion (%) |
|---|---|---|---|
| 1 | 1.05 | 316 | 66 |
| 2 | 0.74 | 177 | 60 |
| 3 | 0.55 | 280 | 65 |
| 4 | 0.35 | 277 | 51 |
| 5 | 0.06 | 175 | 53 |
| 6 | 1.03 | 350 | 55 |
| 7 | 1.04 | 347 | 56 |
| 8 | 1.02 | 355 | 55 |
| 9 | 1.03 | 343 | 57 |
| 10 | 1.02 | 349 | 57 |
| 11 | 1.04 | 346 | 58 |
| 12 | 1.01 | 361 | 77 |
| 13 | 1.06 | 345 | 77 |
| 14 | 1.01 | 346 | 77 |
| 15 | 1.02 | 335 | 77 |
| 16 | 1.03 | 320 | 75 |
| 17 | 1.01 | 322 | 77 |
| 18 | 1.01 | 315 | 77 |
| 19 | 1.02 | 325 | 72 |
| 20 | 1.01 | 333 | 73 |
| 21 | 1.04 | 317 | 68 |
| 22 | 1.01 | 321 | 57 |
| 23 | 1.01 | 319 | 62 |
| 24 | 1.01 | 313 | 77 |
| 25 | 1.01 | 315 | 77 |
| 26 | 0.89 | 254 | 83 |
| 27 | 0.57 | 202 | 75 |
| 28 | 0.63 | 255 | 76 |
| 29 | 0.55 | 190 | 75 |
| 30 | 0.64 | 148 | 75 |
| 31 | 0.52 | 180 | 72 |
| 32 | 0.57 | 197 | 68 |
| 33 | 0.55 | 200 | 64 |
| 34 | 0.47 | 204 | 64 |
| 35 | 0.50 | 180 | 64 |
| 36 | 0.68 | 169 | 82 |
| 37 | 0.46 | 116 | 84 |

*Catalysts 1 to 3 and 6 to 37 are from Examples.
Catalysts 4 and 5 are from Comparative Examples.

The invention claimed is:

1. A catalyst comprising copper, an alkali metal and a rare earth and having pores of which pores having a diameter of 5 to 15 nm have a pore volume of 0.4 to 2.0 ml/g, the rare earth being; lanthanum and samarium; lanthanum and praseodymium; or lanthanum and europium.

2. The catalyst according to claim 1, wherein the catalyst has a specific surface area of 100 to 500 m$^2$/g.

3. The catalyst according to claim 1, wherein the catalyst has a specific surface area of 170 to 500 m$^2$/g.

4. The catalyst according to claim 1, wherein the catalyst contains copper at 1 to 11 wt % based on 100 wt % of the catalyst, and the copper:rare earth weight ratio is in the range of 1:0.6 to 1:1.5 and the copper:alkali metal weight ratio is in the range of 1:0.4 to 1:1.0.

5. The catalyst according to claim 1, wherein the alkali metal is potassium.

6. A process for producing the catalyst described in claim 1, which comprises a step of distributing a copper compound, an alkali metal compound and a rare earth compound in a carrier, the carrier having pores of which pores having a diameter of 5 to 18 nm have a pore volume of 0.5 to 2.5 ml/g.

7. A process for producing the catalyst described in claim 1, which comprises a step of distributing a copper compound, an alkali metal compound and a rare earth compound in a carrier, the carrier having pores of which pores having a diameter of 5 to 18 nm have a pore volume of 0.5 to 2.5 ml/g; and a step of calcining the carrier in which the copper compound, the alkali metal compound and the rare earth compound are distributed at a temperature of 200 to 600° C.

8. The process according to claim 6, wherein the copper compound, the alkali metal compound and the rare earth compound are each independently a chloride, a nitrate or an acetate.

9. A process of producing chlorine comprising oxidizing hydrogen chloride with oxygen into chlorine in the presence of the catalyst described in claim 1.

* * * * *